July 5, 1960

I. W. ARCHIBALD 2,943,347

APPARATUS AND METHOD FOR SETTING
AND CURING BRAKE LINING BLANKS

Filed April 29, 1957

INVENTOR
IAN WILSON
ARCHIBALD
by Mead, Browne, Schuyler & Beveridge
ATTORNEYS

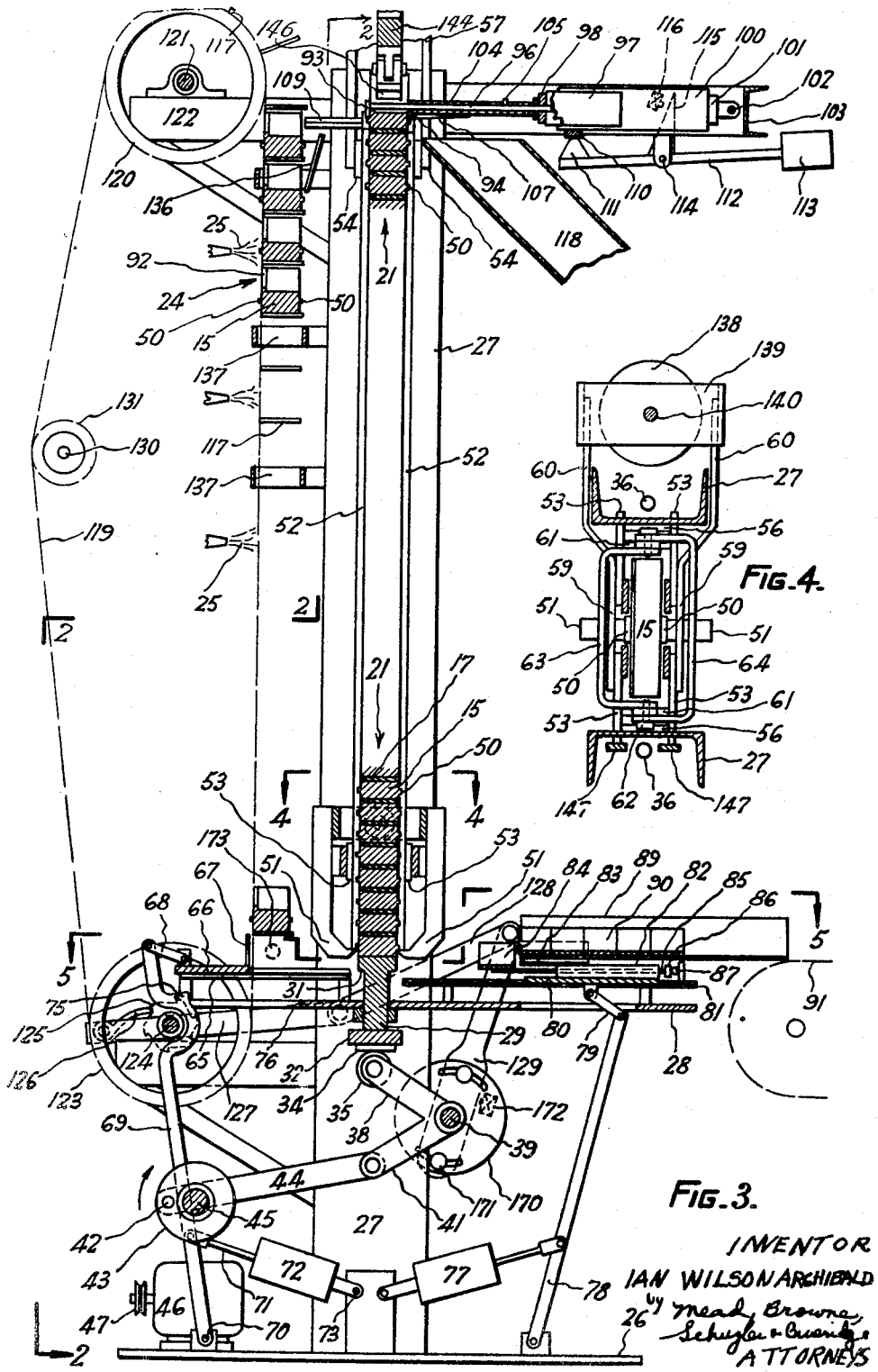

July 5, 1960
I. W. ARCHIBALD
2,943,347
APPARATUS AND METHOD FOR SETTING
AND CURING BRAKE LINING BLANKS
Filed April 29, 1957
4 Sheets-Sheet 3
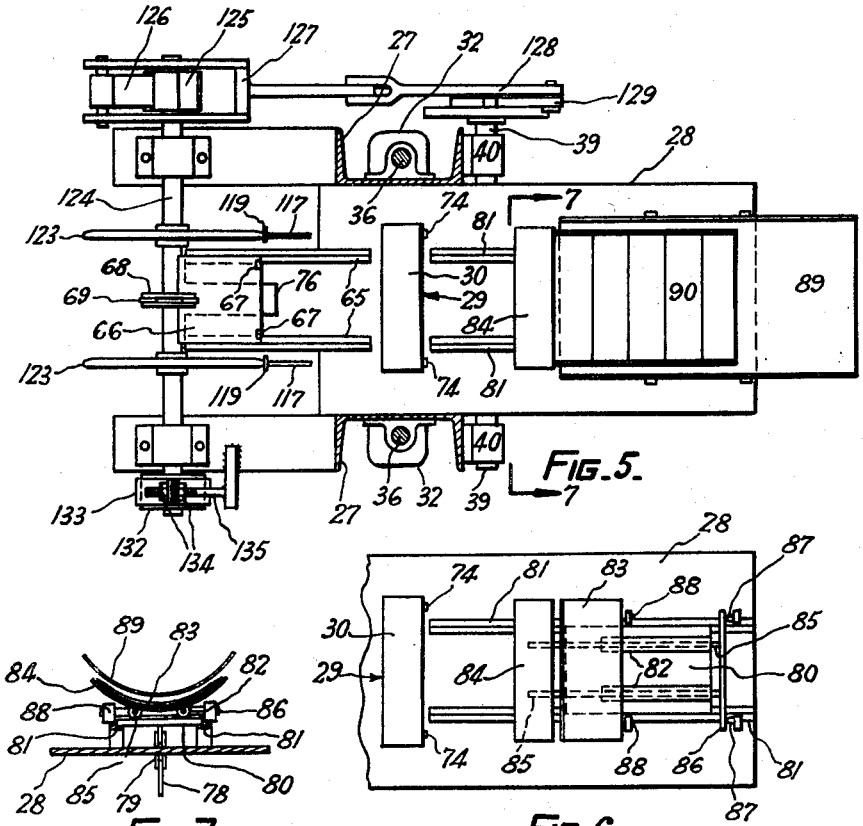
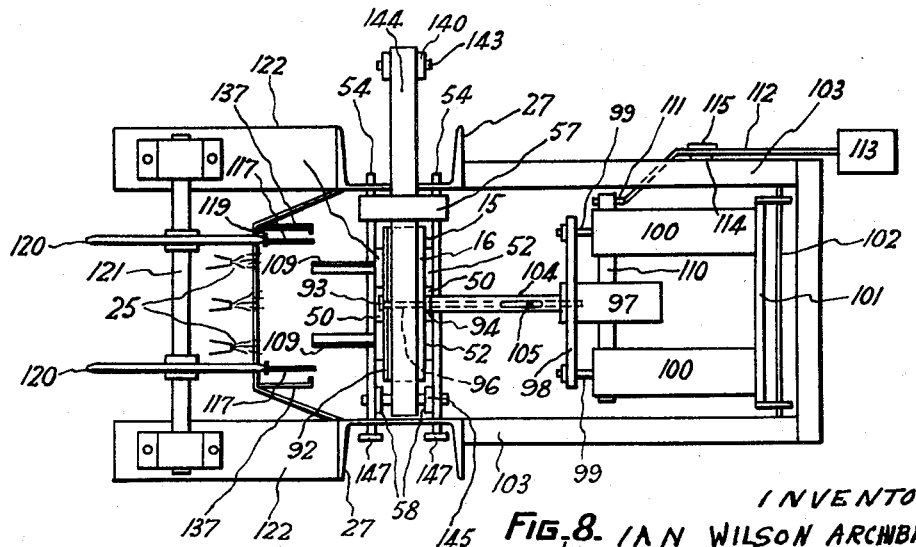
INVENTOR
IAN WILSON ARCHIBALD
Mead, Browne, Schuyler & Beveridge
ATTORNEYS

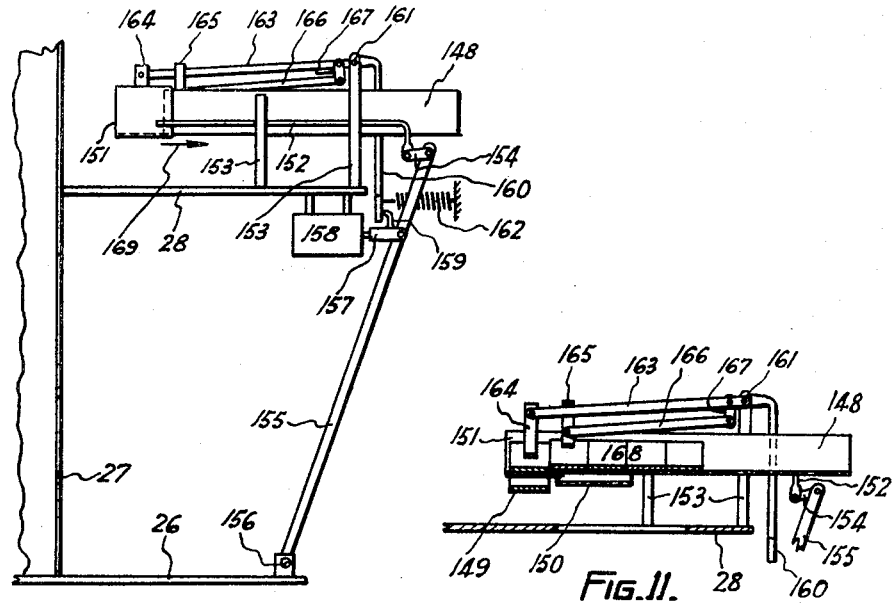
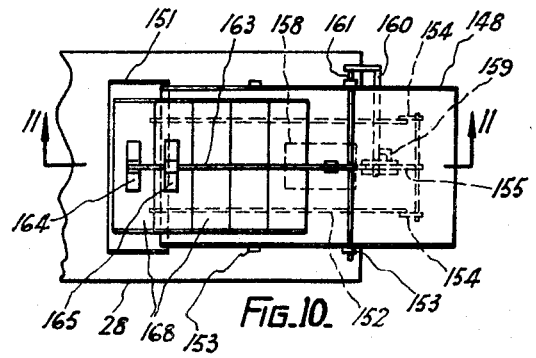
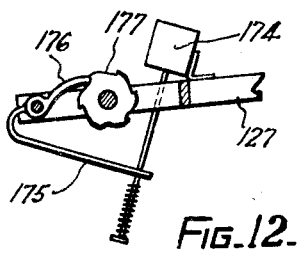
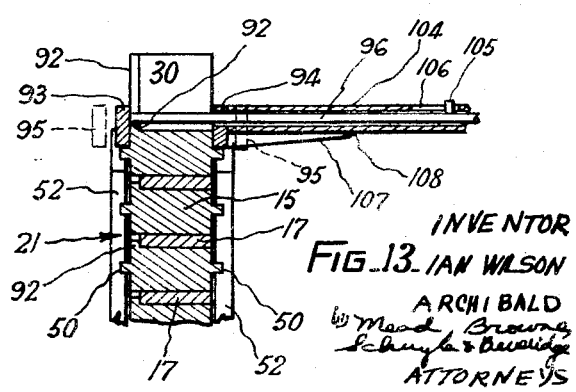

United States Patent Office

2,943,347
APPARATUS AND METHOD FOR SETTING AND CURING BRAKE LINING BLANKS

Ian Wilson Archibald, Sans Souci, near Sydney, New South Wales, Australia, assignor to James Hardie & Coy. Pty. Limited, Sydney, New South Wales, Australia, a company of Australia Filed Apr. 29, 1957, Ser. No. 655,886

Claims priority, application Australia May 7, 1956

10 Claims. (Cl. 18—4)

In the manufacture of brake linings from plastic material able to set to solid condition by heat treatment, the usual procedure is to extrude the material in strip-like blanks; partially cure the blanks by heating; finish curing by further heating accompanied by moulding pressure which ensures setting of the blanks truly in the required final curvature; and lastly, trim the blanks by grinding or otherwise and generally impart the required "finish" thereto.

The extrusion may be carried out to give straight blanks which are bent arcuately prior to partial or initial curing, or by use of apparatus by which blanks are extruded roughly of the required curvature. Initial curing presents no great problem as it may be carried out at the same rate as extrusive production simply by sending the arcuate blanks continuously (on a belt conveyor or the like) through a steam heated oven or the like. This initial curing must, however, be halted while the blanks are still sufficiently plastic to be susceptible to final shaping under the combined moulding and heating action which constitutes the final forming and curing.

Hitherto the usual way of carrying out the final cure is to place a plurality of initially cured blanks, alternated with crescent shaped curing forms (known as "lunettes") in a rectangular frame having an end clamping screw whereby the stack of lunettes, with the blanks sandwiched therebetween, may be so subjected to pressure as to compel the blanks to conform to the shape of the lunettes. While so clamped the stack is stoved or otherwise heated to effect the final formation and cure.

The prior method of final curing, as referred to above, is objectionable in several respects. For example, it is a slow, inefficient, batch-by-batch method which is wholly unsuited as a "follow-on" to the desirable rapid and continuous production of initially cured blanks; unless, lunettes and clamps are provided in very large numbers, and unless stoving space is so great as to be almost economically prohibitive. Further, a great deal of labour is involved in the packing and stripping of the mentioned clamps, and fuel wastage is inevitable in the useless heating of the clamps.

The object of this invention is to overcome the mentioned disabilities by the provision of a method and apparatus by which final forming and curing of brake lining blanks are effected automatically as a continuous process going forward without necessity for stoves or the like, without excessive heat losses, and at a rate which is economically consonant with that at which initially cured blanks may be produced.

The method subject hereof may be summarised as comprising the steps of alternately adding hot lunettes and initially cured brake lining blanks to the bottom of a stack of alternated lunettes and blanks, raising the stack between each lunette and blank addition thereto by an amount at least equal to the height of each such addition, removing lunettes and blanks from the top of the stack at the same rate as the additions are made to the bottom of the stack, returning the removed lunettes to the bottom of the stack for re-addition thereto, and while so returning the lunettes heating them sufficiently to effect final curing of the blanks while they are in the stack.

The invention also includes apparatus for carrying out the method just referred to.

An example of a machine according to the mentioned apparatus is illustrated in the drawings herewith.

Fig. 3 is a sectional side elevation of the machine. In these two figures certain parts are broken away, and some parts are omitted, for clearness of description; but Fig. 2 may be regarded as being substantially taken on line 2—2 in Fig. 3; and Fig. 3 substantially on line 3—3 in Fig. 2.

Fig. 4 is an incomplete sectional plan taken on line 4—4 in Fig. 3.

Fig. 5 is a sectional plan taken on line 5—5 in Fig. 3.

Figures 1, 2, 14:
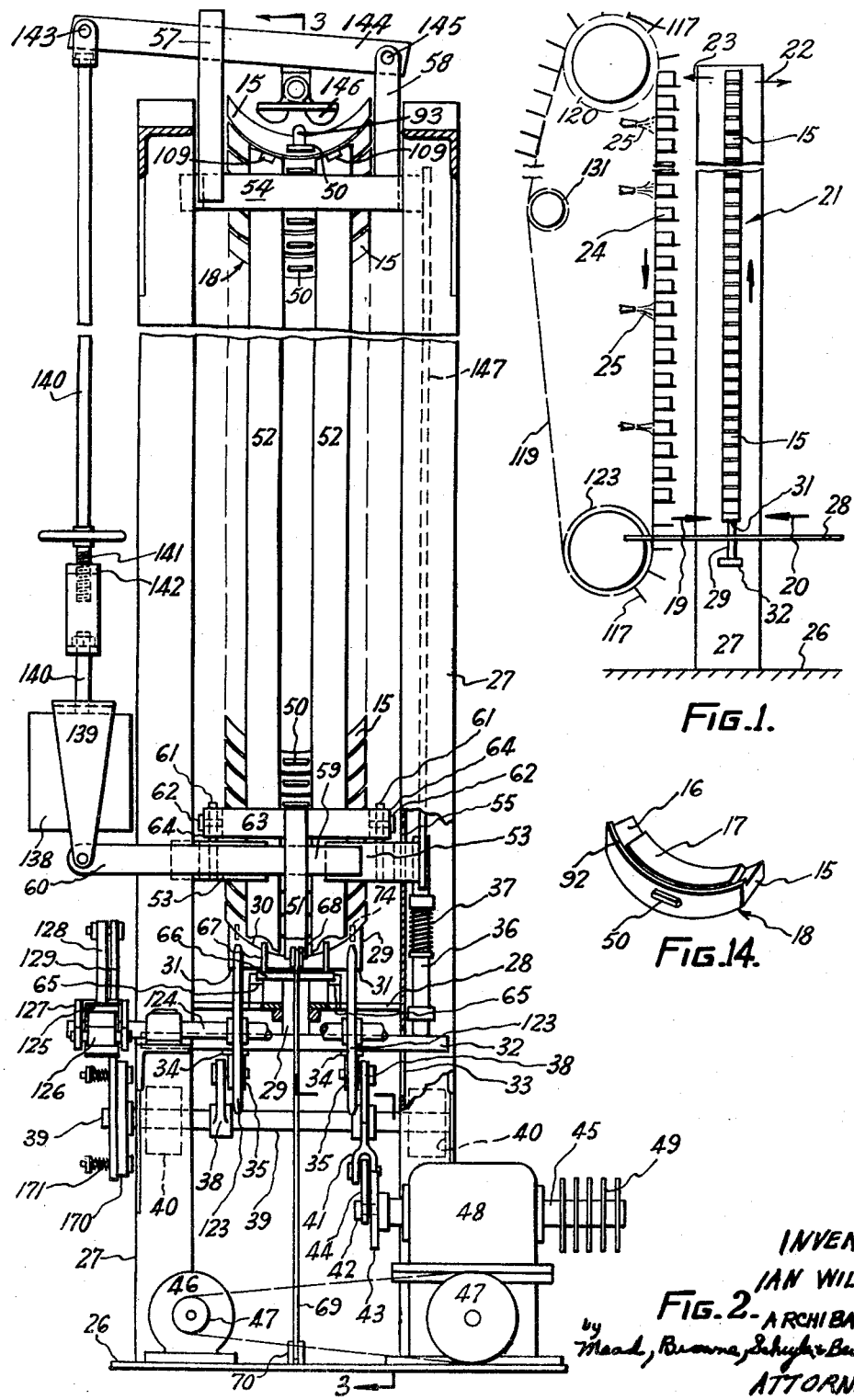
Fig. 1 is a diagrammatic side elevation of the machine, included mainly to illustrate the working paths of the lunettes and blanks in execution of the forming and curing method.
Fig. 2 is an end elevation.

Fig. 6 repeats a right-hand end portion of Fig. 5 but with a feed tray removed.

Fig. 7 is a detail end view taken on line 7—7 in Fig. 5.

Fig. 8 is a plan of the upper portions of the machine.

Fig. 9 is a side elevation showing part of a blank loading device.

Fig. 10 is a plan of the device shown in Fig. 9.

Fig. 11 is a sectional side elevation taken on line 11—11 in Fig. 10.

Fig. 12 is a detail showing part of a mechanism for preventing downfeed of a lunette when another lunette lies obstructively ahead of it.

Fig. 13 is a sectional detail (on an enlarged scale) of certain parts shown at the top of Fig. 3.

Fig. 14 is a perspective view of a lunette with a brake lining blank lying on it.

The lunettes are simply metal bodies 15 having an upper face 16 (see Fig. 14) whereof the curvature is of the same radius as that required of the greater radius face of a liner blank (17) and a lower face 18 of the same curvature as that required of the lesser radius face of the blank.

Referring mainly to Fig. 1, preheated lunettes and initially cured blanks are repeatedly and alternately added, as indicated by arrows 19 and 20 to the bottom of an upwardly movable stack 21 thereof. The heat stored in the lunettes, and the time for which the blanks remain sandwiched therebetween in the upwardly moving stack, are sufficient to effect final curing; and, the self loading effect due to the weight of the stack, supplemented by additional loading means (if necessary) suffices to provide for the moulding or setting of the blanks into conformity with the arcuate faces of the lunettes. At the top of the stack the set and cured blanks are taken from the stack (arrow 22) and the lunettes are similarly removed (arrow 23). The blanks may move on to a conveyor or the like for further treatment. The lunettes are transferred to the top of a downwardly moving column thereof. During their descent the lunettes are reheated (for example by gas flames 25) to top working temperature, and at the end of that descent they are again added to the bottom of the upwardly moving stack for execution of a fresh working cycle.

In the illustrated embodiment of the apparatus, a machine base or stand 26 adapted to be bolted or otherwise anchored to a workshop floor, has a pair of upright columns or standards 27 fixedly mounted thereon. At about table height a loading bench or platform 28 is supported on, and extends horizontally on either side of, the two standards. In the middle of the loading platform (between the two standards) there is a "stack-starting" block or anvil 29. This anvil projects upwardly a short distance from the general level of the loading platform, and its upper surface 30 is arcuate so as to be substantially in conformity with the under or lesser radius faces of the lunettes (15) to be used in the machine.

The anvil 29 is vertically but not rotatably movable within a bearing hole in the platform 28, and is provided with shoulders 31 by which it is (from time-to-time) able to rest stationarily upon the upper surface of the platform. The lower end of the anvil rests (most of the time) upon a beam 32 whereof the ends are guided in slots 33 in the standards 27. The beam 32 has rubbing plates 34 through which the beam rests (all the time) on a pair of rollers 35, so being in cam follower relationship with the rollers, and urged to maintain that relationship by a pair of thrust bolts 36 (only one is shown—in Fig. 2) loaded to bear downwardly on the beam by compression springs 37. Rollers 35 are freely rotatable on the outer ends of crank arms 38 keyed on a drive shaft 39 in bearings 40 fixed on the standards 27.

A bell-crank arm 41 is also fixed to drive shaft 39 and is connected to the pin 42 of a crank plate 43 by a pitman 44. Crank plate 43 is keyed on a main shaft 45 which, during operation of the machine, is turned by a motor indicated at 46 by way of (for example) a belt and pulley drive 47 and an ordinary reduction gear train the casing of which is indicated at 48. The main shaft may carry control cam discs 49 (of known kind) for timed and electrically controlled operation (in conventional manner) of a number of pneumatic rams as referred to later herein.

The anvil is shown, in Fig. 3, just a fraction below its topmost position; and the working stroke or sweep of the rollers 35 is so arranged as to be greater than the distance through which the anvil may descend into its rest position in which its shoulders 31 rest upon the platform 28. By this provision the anvil is able to rise and fall during a portion of each revolution of crank plate 43 and pauses during the remainder of each crank-plate revolution, the beam 32 merely ineffectively receding from and moving back towards the bottom of the anvil during each anvil pause period.

While the anvil is paused in its lowermost position a hot lunette is placed on it (in the direction indicated at 19 in Fig. 1) by mechanism described later herein, and when the lunette is so placed an initially cured liner blank is then put on the top of the placed lunette (in the direction indicated at 20 in Fig. 1) by mechanism also described below. Just after this placement of a lunette and a blank, the anvil starts to rise and thus adds the newly arrived lunette and blank to the bottom of the stack 21 and then lifts the entire stack. It will be noticed that each lunette has a pair of lugs 50 thereon; and, continued stack lift by the anvil, carries the lugs of the newly added lunette between and upwardly past the tips of a pair of freely hanging pawl hooks 51. Just after the lugs pass the hook tips, the anvil reaches the top of its travel and starts its descent back to its pause position in readiness to receive a next lunette and blank. During this anvil descent the stack is prevented from descending with the anvil by reason of the pawl hook tips engaging under the lugs 50 of the lunette most recently added to the bottom of the stack.

The stack thus rises towards the top of the machine in a step-by-step manner; and, in its upward progress it is guided by running within a stack-race which, for constructional simplicity, may consists of four rails 52 mounted on the machine frame by having their ends respectively fixed by welding or otherwise to bottom and top frames consisting of side bars 53 and 54 which are restrained against appreciable lateral movement relative to the machine as a whole; for example, by being entered into slots 55 (Fig. 2) in the standards 27 and (in the case of the bottom bars 53) by end bars 56 (see Fig. 4) fixed between and to the side bars. It is not absolutely essential for the bars 53 and 54 to be totally restrained against lateral movement; and, in the case of the top bars 54, end bars (such as 56) need not be provided, sufficient restraint being afforded by a U-shaped stirrup 57 and a pair of uprights 58 which have their lower ends fixed to the bars 54 and are positioned relatively closely to the upper ends of the standards 27 thus preventing undue movement of bars 54. The stirrup 57 and the uprights 58 are more importantly present to serve a purpose described later herein.

It will be noticed, particularly from Fig. 4, that each of the bottom side bars 53 consists of three parts; namely two outer parts which respectively project through the two standards 27, and a centre piece 59 which extends to one side of the machine as a wing 60 the purpose of which is described below. The three parts of each side bar 53 are rigidly secured together by welding or otherwise; so, in effect, to constitute rigid frame members suitable for the attachment thereto of the rails 52. It will also be noticed that the two rails (52) on each side of the stack race are spaced apart sufficiently to permit the lunette lugs 50 to intrude slidably therebetween, so that these lugs, in addition to their engageability by the pawl hooks 51 following a stack lift, also serve the useful purpose of ensuring that the lunettes in the stack remain truly aligned and prevented from toppling from the stack race.

The side bars 53 have hinge plates 61 fixed therebetween. These hinge plates are holed to accommodate hinge pins 62 upon which two U-shaped bars 63 and 64 are pivotally mounted. These bars have the upper ends of the pawl hooks 51 fixed thereto. This arrangement, by which the pivotting axis for the pawl hooks passes through the stack path, enables the weight of the hooks to be relied on for gravitational engagement of the hook tips with the lunette lugs 50. Clearly, each of the pawl hooks could be hinged about a different axis provided the weight of the hook, or loading springs applied to the hooks, sufficed to influence the hook tips to remain bearing against the lunettes, as they are added to the bottom of the stack, while enabling the hooks to ride yieldingly about a pair of lunette lugs rising therebetween.

Hot lunettes to be added to the bottom of the stack are intermittently deposited, one a time (by conveyor mechanism described later herein) on a pair of runner rails 65, in front of a lunette pusher comprising a plate 66, which is slidable along the rails, and a pair of upright fingers 67 which are fixed on plate 66. The lunette pusher is guided so that it can move longitudinally of the rails, by having its side edges lying in corner grooves formed longitudinally of the rails.

The pusher plate 66 is connected, by a pivot coupled link 68, to the upper end of a pitman 69 pivotally mounted on base 26 as indicated at 70. The free end of the piston rod 71 of a pneumatic ram 72 is pivoted to the pitman 69, and the ram itself is pivotally mounted on the machine base as indicated at 73.

The operation of ram 72 is so timed and controlled that when the lunette pusher (66, 67) is retracted, as shown in Figs. 3 and 5, and a hot lunette is deposited on the rails 65 in front of the pusher, the anvil is in, or just arriving in, its lowermost or pause position. In this pause position of the anvil, it is just low enough for a lunette to slide from the rails 65 on to the anvil; and when so paused, the ram 72 operates to effect such placement of a hot lunette on the anvil.

The lunette pusher is prevented from sending a lunette too far across the anvil by a pair of small upstanding stops 74 fixed on the anvil. As a further precaution, the pitman 69 may have an abutment spur 75 able to limit the working stroke of the pitman by touching the end 76 of a clearance slot in the platform 28. The thrust of the pusher upon a lunette which it has just placed on the anvil, is maintained until a blank has been placed upon the emplaced lunette, and after this (but before the end of the anvil pause period) the ram 72 operates to withdraw the pusher to its retracted position in readiness for a next hot lunette to be deposited in front of it.

The deposit of a blank on a hot lunette newly placed on the anvil, is effected by a blank feeder mechanism comprising a ram 77 and a pitman 78 which are arranged and operate in much the same manner as the similar items 72 and 69. Pitman 78 is connected by pivot link 79 to a runner plate 80, which (like the pusher plate 66) is slidable along rails 81. Plate 80 has a pair of runner tubes 82 fixed thereon, and a blank pusher plate 83 is fixed on top of these tubes. A blank cradle 84 is fixed on the front ends of two rods 85 which are slidable in the runner tubes 82 and have their rear ends fixedly secured to a bumper bar 86 which is able to abut a pair of rear buffers 87 or alternatively a pair of front buffers 88 fixedly mounted on the rails 81 or on the platform 28. A stationarily mounted magazine tray 89 may be provided to hold a supply of blanks to be treated.

Blanks to be treated (90) may be brought to the vicinity of the machine in any convenient manner, for example, by a conveyor belt as indicated at 91 (Fig. 3). The blanks have to be deposited on the cradle 84, one at a time, and with a frequency the same as that at which hot lunettes are placed upon the anvil 29. This deposit may be effected by hand. Alternatively, it may be effected automatically in any convenient manner; for example, by providing a gravity feed delivery chute for a stack of blanks, from the open bottom of which the blank cradle 84 may extract blanks (one at a time) by sweeping across the bottom outlet end of the chute and by having a tail-plate which blocks descent of further blanks, while the cradle is not in position to receive a blank.

By whatever means a blank may be put on the cradle 84, when a blank has been so placed it is fed on to a waiting lunette on the anvil 29 by timed operation of the ram 77 as follows:

As ram 77 commences its working stroke, the runner plate 80 moves towards the anvil and carries the cradle (with a blank on it) and the pusher plate 83 with it. In this motion the cradle remains forwardly projected, as shown in Fig. 3, simply because no force is, at that stage, imposed on it which would cause it to lag. When the bumper bar reaches the forward buffers 88 (see Figs. 6 and 7) it is halted just short of the still paused anvil and slightly elevated above the waiting lunette on the anvil. The anvil is, at this stage, still being held in position on the anvil by the (as yet) un-retracted lunette pusher 66, 67. When the cradle is halted by the buffers 88, the pusher plate 83 continues to advance and thus pushes the blank on to the waiting lunette. Over pushing of the blank is prevented by the leading edge of the blank being obstructed by an upstanding flange 92 provided on each lunette. The height of the flanges 92 is necessarily less than the thickness of a blank.

When a lunette and blank have been placed on the anvil as just explained, the pause period of the anvil ends, and rising of the anvil adds the newly placed lunette and blank to the stack 21, by means of the pawl hooks 51, as previously described herein. In this manner, the lunette-blank stack is built up, and once built up, maintained, for the full height of the stack holder.

The repeated additions to the bottom of the stack necessitate same-rate removal of cured liner blanks and lunettes from the top of the stack.

When a lunette becomes the top lunette in the stack it will have been just previously deprived of its blank (which was put on it when it was added to the bottom of the stack) as explained below; and, during the stack lift which brings the top (empty) lunette to its highest elevation, it enters loosely between two removal jaws 93 and 94, these jaws being, at that stage, substantially in the spread apart position indicated by the dotted lines 95 in Fig. 13.

Jaw 93 is fixed on the outer end of the piston rod 96 of a pneumatic ram 97 mounted on a bridge bar 98. This bridge bar is itself mounted on the free ends of the piston rods 99 of a pair of rams 100 fixedly mounted on a hinge bracket 101. Bracket 101 is pivotally mounted on a pin 102 supported on a frame member 103 secured to the standards 27. The jaw 94 is fixed on a tubular arm 104, through which piston rod 96 slidably extends, and which is fixed on the bridge bar 98. Rod 96 has a stub pin 105 which extends into a slot 106 in arm 104 thereby to set required limits on the amount by which rod 96 may move inside arm 104, and also to prevent unwanted rotation of rod 96. A rider wedge 107 fixed on the underside of arm 104 extends from the lower edge face of jaw 94 and ends in a small shoulder 108.

Any suitable stop may be provide to prevent the ejector ram assembly (93 to 101) swinging too far downwardly about its hinge pin 102. If desired such a stop may be provided which ensures against operation of the rams 97 and 100 until the jaws 93 and 94 are sufficiently elevated (by piston rod 96 resting on a rising top lunette) properly to transfer the top lunette on to a pair of runner rails 109. Such an arrangement is preferably present, and may consist of a cam bar 110 fixed to the cylinders of rams 100, a follower nose 111 adapted to ride against the bar 110, a lever 112 which carries the nose 111 and a counterweight 113 and is fulcrumed at 114 on frame member 103, a striker spur 115 fixed relative to lever 112, and a stationarily mounted microswitch or the like indicated at 116 (Fig. 3) which lies in the movement path of spur 115. The switch 116 is included in the control circuit for the rams 97 and 100 thus to prevent them operating (so that the jaws 93 and 94 remain widely separated as indicated at 95 in Fig. 13) for so long as the striker spur 115 bears against the switch 116.

When the empty lunette at the top of the stack rises sufficiently, it rides against the underside of the piston rod 96 and lifts it thus moving striker 115 clear of the switch 116 to complete the control circuit for the rams 97 and 100. These rams are operated in timed consonance with the pause periods of the stack 21; and, upon operation, the jaw 93 is moved by its ram 97, from the dotted position 95, Fig. 13, to the full line position shown in that figure. The rams 100 are similarly operated to bring the jaw 94 against the empty lunette (as shown in Figs. 3, 8 and 13) and continued operation of rams 100 moves the top lunette from the stack, slides it along rails 109 and places it on a pair of lowering prongs (such as 117) which (at that time) are paused just below the level of rails 109. The ram 97 then performs its return stroke thus carrying jaw 93 beyond the deposited lunette, and the rams 100 commence their return stroke thus to relinquish the jaw grasp on the lunette now placed on the prongs 117. Immediately following this lunette release, the prongs carrying the lunette are lowered, thus moving the lunette clear of the ejector jaws. At this stage the tubular arm 104 has lowered sufficiently to rest on the blank lying on the next upcoming top lunette, and as the rams 100 continue their return stroke the shoulder 108 on the rider wedge 107 bears against the top blank and scrapes it from its lunette on to a conveyor belt or the like or into a catchment chute (as indicated at 118 in Fig. 3) for disposal as may be required. The wedge 107 then rides the flange 92 of the newly emptied top lunette and the two jaws 93 and 94 re-assume their positions of loosely straddling the now top lunette, in readiness for the transfer thereof to a pair of lowering prongs such as 117.

When a lunette is being moved from the stack there is, of course, a tendency for the blank below it to be dragged along with it. This tendency is negatived by the flange 92 of the next lower lunette against which the blank abuts and is thus prevented from moving in the direction of lunette departure. When a blank is being removed from the top of the stack, the next lunette (below it) is similarly restrained by not (at that stage) being clear of the stack race.

As already stated, each removed lunette is placed on a pair of lowering prongs such as 117. Such a pair is one of a series thereof which project from and are equally spaced about a pair of endless conveyor elements. These elements are preferably sprocket chains 119 meshed about two idler sprocket wheels 120 keyed on a single shaft 121 in bearings on brackets 122 fixed at the top of the machine, and a similar pair of driving sprocket wheels 123 similarly mounted at the bottom of the machine. The bottom sprocket shaft 124 is a driving shaft and has a driving ratchet wheel 125 keyed thereon. A driving pawl 126 pivotally mounted on an oscillatory drive lever 127 fulcrumed on shaft 124 is able to ride the ratchet wheel ineffectually when moving in one direction, and to part rotate the ratchet wheel when moving in the opposite direction. The oscillatory drive lever is linked (128) to a crank web 129 on the drive shaft 39 for concerted operation thereby. The sprocket drive is so arranged that as the sprocket chains halt at the end of each of their intermittent movements, a pair of the lowering prongs 117 come to rest just below the level of the runner rails 109. The prongs' downward path is aligned with the lunette receiving station of the runner rails 65, and (as shown in Fig. 5) the spacing of the prongs in each pair thereof is generously greater than that of rails 65; consequently, as a pair of prongs, carrying a lunette, move past the waiting rails, they leave the lunette on the rails in readiness for transfer thereby to the anvil as previously explained.

It will be seen that as the loading due to the weight of the lunettes is applied to the conveyor chains entirely one-sidedly, it is necessary to apply a counter loading to the chains so that the ratchet 125 will not over-run the driving pawl 126. This may be effected by having a constantly applied braking load imposed on the shaft 130 of a pair of chain tensioning jockey sprockets indicated at 131. Alternatively, the bottom sprocket shaft 124 (or the top shaft 121) may be similarly braked; for example, by having a brake drum 132 keyed on the shaft (see Fig. 5) and surrounded by a brake band 133. The counter loading effect of band 133 may be suitably selected by adjusting nuts 134 on a screwed stem 135 secured to the machine frame.

To make sure that the lunettes are accurately positioned while they are being heated and when they arrive at the bottom of the lunette column 24, they may be positionally adjusted by a number of corrective devices while they are making their downward journey. Such devices may comprise one or more stationarily mounted deflector plates 136 (see Fig. 3) which, as the lunettes sweep past, thrusts them (if necessary) uniformly towards the sprocket chain ends of the prongs 117. To adjust the descending lunettes longitudinally (if necessary) a number of joggling arms 137 may be provided. These arms are stationarily mounted and the span distance of each pair is slightly greater than the lunette length, so that if a descending lunette is badly placed (in the longitudinal sense) on the prongs supporting it, its unduly projecting end will strike one of the arms 137 and will thus be joggled into correct position.

While the lunettes are descending on the lowering prongs 117, they are (as previously indicated) heated by the gas jets 25 or by other common heating devices. If gas burners are used (as is preferred) they are preferably so arranged that every descending lunette, in each of its halting positions, is directly exposed to a number of gas flames. It will be appreciated that the heating of the lunettes has to be such that when the hot lunettes are added to the blank-lunette stack, they are able to give up sufficient heat to the blanks (while in the stack) to effect final setting and curing thereof.

It will be clear that when a hot lunette and a liner blank are first added to the bottom of the stack, the lunette is at its hottest and the blank is, at the same time, subjected to maximum moulding pressure, due to the full weight of the stack being temporarily imposed thereon. This moulding pressure may be sufficient, by itself, to effect the necessary setting or moulding of the blanks, the stack race simply being designed of such tallness as will provide a stack dead weight sufficient to give full moulding pressure. However, means to provide additional moulding pressure are preferably provided. Such means may comprise a pneumatic ram 138 mounted on the wings 60 by way of a bracket 139. This ram has a piston rod 140 (which preferably includes an adjustment screw 141 in a nut 142) coupled at 143 to a loading lever 144 fulcrumed at 145 to the uprights 58, and restrained against over-rising by stirrup 57. Lever 144 has a loading shoe 146 (centrally cleft to clear piston rod 96) pivotally mounted on it, and the operation of ram 138 is controlled so that shoe pressure is put on the stack 21 while it is stationary, and relaxed while it is rising. In this connection it will be clear that shoe pressure cannot be applied throughout each stack pause period but only during that part of each such period when neither a lunette nor a cured blank is being removed from the stack.

It will be understood that the stack loading effected by the ram is in the nature of what may be called a "nut-cracker" action in which the stack 21 is the "nut" in compression between the shoe and the pawl hooks 51. The piston rod 140 is in tension during stack loading and thus the right-hand ends of the frame members 53 and 54 (as seen in Fig. 2) tend to move apart. This tendency may be counteracted by the provision of tension rods 147 whereof the ends are respectively secured to the members 53 and 54.

Earlier herein it was stated that initially cured blanks could be placed, one at a time, on the cradle 84 in any one of several different ways, including manual placement if desired. Figs. 9 to 11 illustrate a mechanism whereby the blanks may be fed from a receiver tray to a cradle. This illustrated mechanism is purely additive to the blank feeding mechanism already described. That is to say; although, all the parts of the previous mechanism are not shown in Figs. 9 to 11, the receiver tray 148, the cradle 149 and the pusher plate 150 are the same, and the mounting and operation thereof are the same, as herein described with respect to the corresponding items numbered 89, 84, and 83 in Figs. 3 to 7.

In the feeding mechanism under description an extra shutter plate 151 is provided. This plate is curved, just like the cradle 149, to hold initially cured blanks. Plate 151 is normally directly above the cradle as shown, but it is retractable (that is, movable to the right in Fig. 11) between the tray 148 and the pusher plate 150, being secured on the outer ends of support rods 152 which are longitudinally slidable through holes in support posts 153 mounted on the platform 28. Rods 152 are linked (154) to a pitman 155 fulcrumed at 156 on the machine base 26. The piston rod 157 of a pneumatic ram 158 is coupled to the pitman 155, and this rod has a spur 159 thereon which bears against one arm 160 of a bell crank fulcrumed on a pin 161. The arm 160 is held in touch with the spur 159 by a loading spring 162, and on the free end of the second arm 163 of the bell crank U-shaped dropper 164 is pivotally hung. An inverted U-shaped braking dropper 165 is draped over the arm 163 and is loosely held in required position by a radius rod 166 which is pivotally connected to the dropper 165 and to the arm 163 by way of a pivot link 167.

Blanks to be treated (168) are fed to the tray 148 by a gravity feed chute, endless belt conveyor or the like, at a rate sufficient to keep a supply thereof banked up in the tray, as shown in Figs. 10 and 11, and to keep the blanks moving towards the shutter 151 if unobstructed. When a blank on the shutter is to be fed to the machine, ram 158 is operated so that the shutter 151 retracts in the direction indicated by arrow 169 in Fig. 9. The leading blank is then free to fall on to the cradle 149 for feeding to a hot lunette on the anvil 29 as previously explained. Movement of pitman 155 to retract the shutter 151 also withdraws the spur 159 from the bell crank arm 160 so that the spring 162 causes the bell crank arm to descend. The resulting downward movement of the dropper 164 ensures descent of the leading blank into the cradle 149 and at the same time allows the braking dropper 165 to fall on to the next blank at the departure end of tray 148. In this descent motion the arm 163 then bears upon the upper edge of radius rod 166 so that the loading effect of spring 162 is then also applied to the braking dropper 165, and thus it holds the blanks in the tray against further forward movement until such time as the shutter 149 has reverted to its blank receiving position shown in Figs. 9 to 11.

The machine as described above with reference to the drawings, has, in a more-or-less experimental prototype thereof, shown itself to be fully effective for the purposes indicated; however, it is desirable that safeguards, which may all be of conventional mechanical or electrical kind, be incorporated to ensure against the possibility of imperfect functioning of some of the machine parts. Some of these safeguards may (for example) be as follows:

In the event of the lunette downfeeding conveyor (119) or parts movable therewith being obstructed, it is desirable that the drive thereto be halted. To this end the crank web 129 may be connected to the drive shaft 39 by way of a friction plate 170 loaded by springs 171. In the event of obstruction this friction coupling may yield thus enabling rotation of plate 170 relative to web 129. This relative movement may be used to cause depression of a microswitch or the like mounted on plate 170 as indicated at 172 in Fig. 3. This switch could be included in the supply circuit of motor 46, so to open that circuit before any serious damage is done.

Where there is a lunette standing on the runner rails 65 of the lunette feeder, it is desirable that the lunette lowering conveyor be unable to operate until the standing lunette has been fed to the anvil 29. This can be arranged by having the position occupied by a standing lunette in a light beam directed towards a photoelectric cell (indicated at 173 in Fig. 3). The operation is such that when a standing lunette is in the beam the cell operates a relay 174 (see Fig. 12) which by pulling on tail 175 of pawl 176 (the equivalent of pawl 126 on the oscillatory drive lever 127) disengages the pawl clear of the ratchet wheel 177 (same as ratchet wheel 125) whereby drive is (normally) transmitted to the lunette lowering conveyor.

As a further precaution, the slots such as 55 (Fig. 2) in which the ends of the frame members 53 and 54 are entered, may be upwardly elongated (as shown in Fig. 2—at 55) so that the stack holder 52 and all of the parts mounted relative thereto may rise as a single entity in the event of some obstruction occurring between the bottom of the stack race and the anvil while the anvil is performing its upward working stroke.

Still another precautionary measure may be provided in the form of a switch in the control circuit of the blank feeding ram 77. This switch (not shown) could lie in the path of the lunette feeder pitman 69 so to ensure that blank infeed will not take place before the lunette feeder has operated to put a lunette on the anvil in readiness to receive a blank.

It will be apparent from the foregoing that the stack lifting operation is effected by purely mechanical transmission devices operable by the motor driven main shaft 45, and that the lunette lowering conveyor is operated contingently upon operation of the stack lifting drive. It is obviously necessary, however, that the several pneumatic rams such as those for placement of lunettes and liner blanks on the anvil, and for removal of lunettes and blanks from the top of the stack, also be operated in timed consonance with the purely mechanical drives referred to above. This timed operation of the rams as indicated herein may be effected by the provision of cam discs on the main drive shaft (such as 49) which, in more or less conventional manner, operate ordinary electro-pneumatic relays to effect the required sequential actuation of the rams. The above mentioned safeguarding switches (such as 116 and 172) are placed in these relay circuits in known manner.

As previously stated herein the machine as illustrated represents a prototype which although satisfactorily workable may have to be extensively re-designed for commercial use. Thus it will be understood that there may be considerable departure from the mechanical features of the illustrated machine, but without departure from the essence of the invention; for example, the several pneumatic ram means may be replaced by ordinary mechanical linkages; again, the lunette lowering means may consist of a gravity feed chute from hte bottom of which heated lunettes are released one at a time by pawl devices substantially similar, but reversely operable, to the stack lifting arrangements described above.

I claim:

1. Apparatus for the final forming and curing of brake lining blanks comprising, an upright stack race supported in a machine frame adapted to support a plurality of vertically stacked lunettes, said race having oppositely disposed slots extending the full height thereof, each of said lunettes provided with oppositely disposed lugs thereon which extend into said slots and permit the lunettes to move vertically in aligned relationship to said race and to each other, a vertically movable anvil directly below the bottom of said race, drive mechanism for intermittently moving said anvil towards and from said race, means at the lower end of said frame for maintaining said stack at each elevation to which it is raised by said anvil, first pusher means adapted to place a lunette on said anvil from one side thereof, second pusher means adapted to place a blank on a lunette supported by said anvil from the opposite side thereof, ejector means at the top of said frame, including a part for moving a top lunette and a part for removing a treated blank from the top of said stack, a conveyor adjacent said upright stack race adapted to receive lunettes from said ejector means and lower them to said first pusher means, and heating means adjacent said conveyor for heating lunettes while disassociated from blanks to be treated and while being lowered by said conveyor.

2. Apparatus according to claim 1 wherein; said stack race and its supports comprise, four rails able to guide lunettes moving upwardly therethrough by means of said lugs on said lunettes, a pair of frames to which said rails are attached, and a pair of machine standards whereon said frames are supported; and wherein said means for maintaining said stack at each elevation to which it is raised by said anvil consist in a pair of pawl hooks pivotally mounted on the lower of said frames and adapted to engage said lugs.

3. Apparatus according to claim 1 which comprises, a platform mounted on said machine frame and having a bearing hole in it within which said anvil is vertically slidable, and a shoulder on said anvil able to rest on the top of said platform; and wherein said drive mechanism incorporates a pair of crank arms for raising said anvil whereof the working stroke is greater than that of said anvil.

4. Apparatus according to claim 1 wherein said first pusher means comprise, runner rails mounted on said machine frame, a pusher plate slidable on said rails towards and from said anvil, a pitman connected to said pusher plate, and electro-pneumatic ram devices for oscillating said pitman concertedly with operation of said anvil.

5. Apparatus according to claim 1 wherein said second pusher means comprise, runner rails mounted on said machine frame, a runner plate slidable on said rails towards and from said anvil, a blank cradle slidably mounted on said runner plate, a blank pusher fixedly mounted on said runner plate, a pitman connected to said runner plate, and electro-pneumatic ram devices for oscillating said pitman concertedly with operation of said anvil.

6. Apparatus according to claim 1 wherein said ejector means comprise, a first jaw able to bear against one side of a top lunette, a second jaw able to bear against the opposite side of the same lunette, hingedly mounted first pneumatic ram devices for operating said first jaw, second pneumatic ram devices for operating said second jaw which incorporate a cylinder fixedly mounted relative to said first jaw, and a shouldered rider wedge fixedly associated with said first jaw.

7. Apparatus according to claim 1 wherein said conveyor comprises, a pair of endless sprocket chains, a series of lowering prongs on said chains, idler and driving sprocket wheels for said chains, and pawl and ratchet wheel devices for step-by-step rotation of said driving sprocket wheels concertedly with operation of said anvil.

8. Apparatus according to claim 1 which includes stack loading devices comprising, a loading lever fulcrumed relative to the machine frame, a loading shoe mounted upon said lever directly above said stack race, and electro-pneumatic ram devices for intermittently hauling upon said loading lever in consonance with operation of said anvil.

9. A lunette for use with apparatus according to claim 1 which consists of a metal body having an upper face whereof the curvature is of the same radius as that required of the greater radius face of a brake liner blank, a lower face whereof the curvature is of the same radius as that required of the lesser radius face of a brake liner blank, an upstanding flange which extends along one longitudinal side of said upper face, and a lug projecting from each uncurved side face of the body.

10. Apparatus for the final forming and curing of brake lining blanks comprising a vertical stack race supported in a machine frame and adapted to guidingly support a plurality of vertically stacked, alternated lunettes and blanks, means at the lower end of said frame on said race adapted to cooperate with the lunettes to constrain the lunettes to move vertically in aligned relationship to said race and to each other, a vertically movable anvil directly below the bottom of said race adapted to support a lunette, first pusher means adapted to place a lunette on said anvil, second pusher means adapted to place a blank on a lunette supported by said anvil, drive mechanism for intermittently moving said anvil toward and from said race to push a lunette and a blank supported by the anvil into engagement with a lunette in the stack and raise the stack one step, means for maintaining said stack at each elevation to which it is raised by said anvil, ejector means at the top of said frame including a part for moving a top lunette from said stack and a part for removing a treated blank from the top of the stack alternately, a conveyer adjacent said stack race adapted to receive lunettes from said ejector means and lower them to said first pusher means, and heating means along said conveyor for heating the lunettes while disassociated from the blanks to be treated while being lowered by said conveyer.

References Cited in the file of this patent

UNITED STATES PATENTS

| | | |
|---|---|---|
| 1,677,200 | Oakley | July 17, 1928 |
| 1,875,712 | Duval | Sept. 6, 1932 |
| 2,790,206 | Cofek | Apr. 30, 1957 |